United States Patent
Young et al.

(10) Patent No.: US 7,287,219 B1
(45) Date of Patent: Oct. 23, 2007

(54) METHOD OF CONSTRUCTING A DOCUMENT TYPE DEFINITION FROM A SET OF STRUCTURED ELECTRONIC DOCUMENTS

(75) Inventors: Jeff Young, San Jose, CA (US); Joel A. Nava, San Jose, CA (US)

(73) Assignee: Abode Systems Incorporated, San Jose, CA (US)

( * ) Notice: Subject to any disclaimer, the term of this patent is extended or adjusted under 35 U.S.C. 154(b) by 0 days.

(21) Appl. No.: 09/266,680

(22) Filed: Mar. 11, 1999

(51) Int. Cl.
*G06F 15/00* (2006.01)
*G06F 17/00* (2006.01)

(52) U.S. Cl. .............. 715/523; 715/500.1; 715/514; 709/206

(58) Field of Classification Search .......... 715/500, 715/514, 500.1, 523; 709/206; 358/1.18
See application file for complete search history.

(56) References Cited

U.S. PATENT DOCUMENTS

| | | | |
|---|---|---|---|
| 5,629,846 A | 5/1997 | Crapo | 708/705 |
| 5,752,021 A | 5/1998 | Nakatsuyama et al. | 707/5 |
| 5,848,386 A | 12/1998 | Motoyama | 704/5 |
| 5,915,259 A | 6/1999 | Murata | 707/513 |
| 5,920,879 A | 7/1999 | Kyojima et al. | 707/517 |
| 5,948,058 A * | 9/1999 | Kudoh et al. | 709/206 |
| 6,009,436 A | 12/1999 | Motoyama et al. | 707/102 |
| 6,014,680 A | 1/2000 | Sato et al. | 707/513 |
| 6,031,625 A * | 2/2000 | Sherman et al. | 358/1.18 |
| 6,202,072 B1 | 3/2001 | Kuwahara | 707/513 |
| 6,212,532 B1 * | 4/2001 | Johnson et al. | 707/500 |

| | | | |
|---|---|---|---|
| 2002/0002566 A1 * | 1/2002 | Gajraj | 707/513 |

FOREIGN PATENT DOCUMENTS

| | | |
|---|---|---|
| EP | 1004968 A2 | 5/2000 |
| GB | 2307571 A * | 5/1997 |
| GB | 2307571 A | 6/1997 |

OTHER PUBLICATIONS

Wang, Ke. et al., Discovering typical structures of documents: a road map approach, Annual ACM Conference on Research an Development in Information Retrieval, Aug. 1998, pp. 146-154.*
Poullet, L. et al., Semantic structuring of documents, IEEE Information Technology, Jul. 4, 1997, pp. 118-124.*

(Continued)

*Primary Examiner*—William Bashore
(74) *Attorney, Agent, or Firm*—Fish & Richardson P.C.

(57) ABSTRACT

A method of generating a definition for a collection of source documents is provided. Patterns common to each source document in the collection of source documents are identified and restrictive general rules based on the identified common patterns are then constructed for element types. The construction of a restricted general rule includes constructing a content model that specifies the sequence order and number of occurrences of sub-elements within the common pattern. It further includes constructing attribute definitions and values rules for attributes occurring in the common patterns. Also provided is a method of converting a format of a first source document to a format of a similarly structured second source document is provided. The method identifies patterns common to the first and second source documents and maps elements and sub-elements in common pattern of the first source document to equivalent elements and sub-elements in the common pattern of the second source document.

17 Claims, 9 Drawing Sheets

OTHER PUBLICATIONS

Cohen, William W., Learning Rules that Classify E-Mail, AAAI Spring Symposium on Machine Learning in Information Access, 1996.*

Chun-Sik Yoo et al., "Automatic Generation Algorithm of Unfirm DTD for Structured Documents", TENCON 99. Proceedings of the IEEE Region 10 Conference, Sep. 15-17, 1999, pp. 1095-1098, XP010368451.

Ke Wang et al., "Discovering Typical Structures of Documents: A Road Map Approach", 21st Annual International ACM Sigir Conference on Research and Development in Information Retrieval, Aug. 24-28, 1998, pp. 146-154.

* cited by examiner

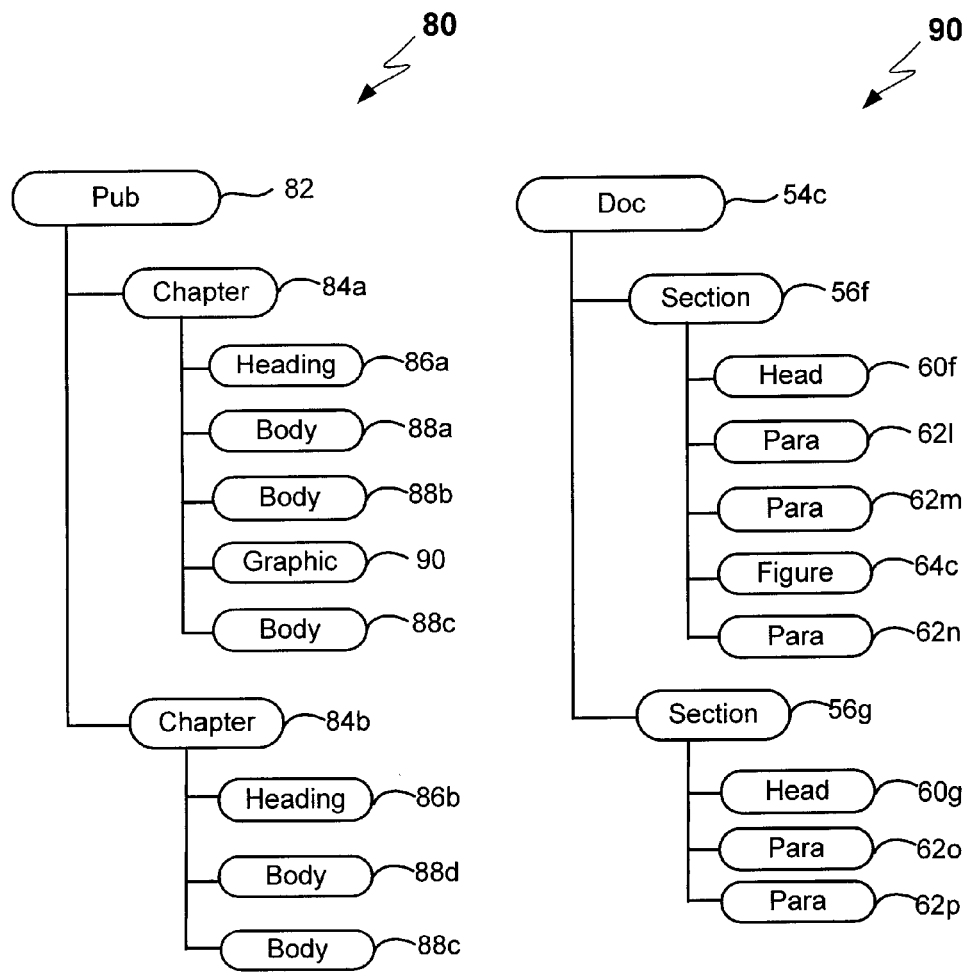
FIG. 6   FIG. 7

METHOD OF CONSTRUCTING A DOCUMENT TYPE DEFINITION FROM A SET OF STRUCTURED ELECTRONIC DOCUMENTS

BACKGROUND OF THE INVENTION

The present invention relates generally to electronic document processing.

Numerous publishing systems have been developed to assist in the production of structured electronic documents. These publishing systems contain document authoring tools such as text editors which allow a publisher to add descriptive markup to an electronic document. The descriptive markup assigns meaning to various regions of an electronic document. For instance, some paragraphs may be marked as body paragraphs, while others are marked as headings. The structure of such electronic documents may or may not be hierarchical. For example, various marked regions may contain other regions, such as a section containing several sub-sections, each of which contain a heading and one or more paragraphs. These marked regions are referred to as elements, each of which has a particular type (e.g., paragraph). Because descriptive markup defines a document's structure as including a set of element types which, when taken together, typically form a tree or similar hierarchical object, the tree of element types is often referred to as the document's "structure".

An example of a descriptive markup language for electronic documents is specified by the ISO Standard 8879: "Standard Generalized Markup Language", or "SGML". SGML is a markup language that uses tags to prepare structured documents. In a document prepared in accordance with SGML, an element has a begin tag and its content, and an end tag, when necessary. For example, a document may use the embedded begin and end tags <para> and </para>, respectively, where "para" is the tag name corresponding to a paragraph element, to delimit paragraphs. The content may include text and other elements.

A structured document can be associated with a rule-base which defines the legal structures that the document can have. Such a rule-base is called a document type definition (DTD). For each element type, the DTD provides a general rule which governs the content of elements of the rule type. Also provides is an attribute definition rule which specifies an attribute name, type and optional default value for a given element. Thus, the DTD describes the characteristics and properties associated with each element type, and which sub-elements are valid within any given element.

A general rule can be unrestrictive. That is, there are no restrictions on what elements of the rule type can contain. An unrestricted general rule can be written as "ANY". A general rule can also be restrictive, specifying order and occurrence within the content of an element type. The restrictive general rule is stated in an expression language for specifying allowed patterns of sub-structures. Using the expression language, a restrictive general rule can be written as an expression with grouping operators (parenthesis), joining operators (commas for an ordered sequence and or-bars for an unordered sequence), and occurrence operators (a question mark for zero or one, an asterisk for zero or more, and a plus sign for one or more). For instance, the restrictive general rule "head, para+" requires that the content be a head element followed by one or more para elements. As another example, "(para=figure)*" is interpreted to allow any number of paragraphs and/or figures in any order.

SUMMARY

In one aspect of the invention, a method of generating a document type definition (DTD) for a collection of source documents includes identifying patterns common to each source document in the collection of source documents and constructing for an element type in the collection of source documents a restrictive general rule based on the identified common pattern. The common patterns are identified by identifying common element sub-structures and attributes, i.e., attribute names and types as well as attribute values to be applied to the common attributes. The construction of the restricted general rule includes constructing a content model that specifies the sequence order and number of occurrences of sub-elements within the common pattern. It further includes constructing attribute definitions and value rules for each identified common attribute name and type.

In another aspect of the invention, the method identifies those patterns found to achieve a predetermined threshold of commonness (so-called "threshold patterns") and constructs for element types in the collection of source documents a restrictive general rule based on the identified threshold patterns.

In yet another aspect of the invention, a method of converting a format of a first source document to a format of a similarly structured second source document comprises identifying patterns common to the first and second source documents and mapping elements and sub-elements in the common pattern of the first source document to equivalent elements and sub-elements in the common pattern in the second source document. The method replaces tag names for each of the elements and sub-elements in the first source document with the tag names of the equivalent elements and sub-elements in the second source document.

The definition generation technique provides a single document type definition against which an entire set of same-structured source documents may be validated. Moreover, users producing new documents to be added to the set may use the DTD to ensure that mandatory sub-elements and attribute specifications are always provided. Thus, any newly produced documents are automatically valid.

The mapping process allows documents that are authored in one format, e.g., word processing or publishing format, to be converted to a second format automatically, i.e., without user intervention. Such an automated DTD mapping process is most beneficial when document format conversions involve a significant amount of document processing effort. For example, a publisher may find it desirable to convert documents from an "in-house" DTD (such as XML) to HTML for Web delivery or re-engineer its internal documentation around a different DTD.

BRIEF DESCRIPTION OF THE DRAWINGS

The above features and advantages of the present invention will become more apparent from the following detailed description taken in conjunction with the accompanying drawings, in which:

FIG. 6 is a hierarchical representation of a source document to be processed by the DTD mapping process of FIG. 5.

FIG. 7 is a post-processing, hierarchical representation of the source document depicted in FIG. 6.

DESCRIPTION

Figure 1A:
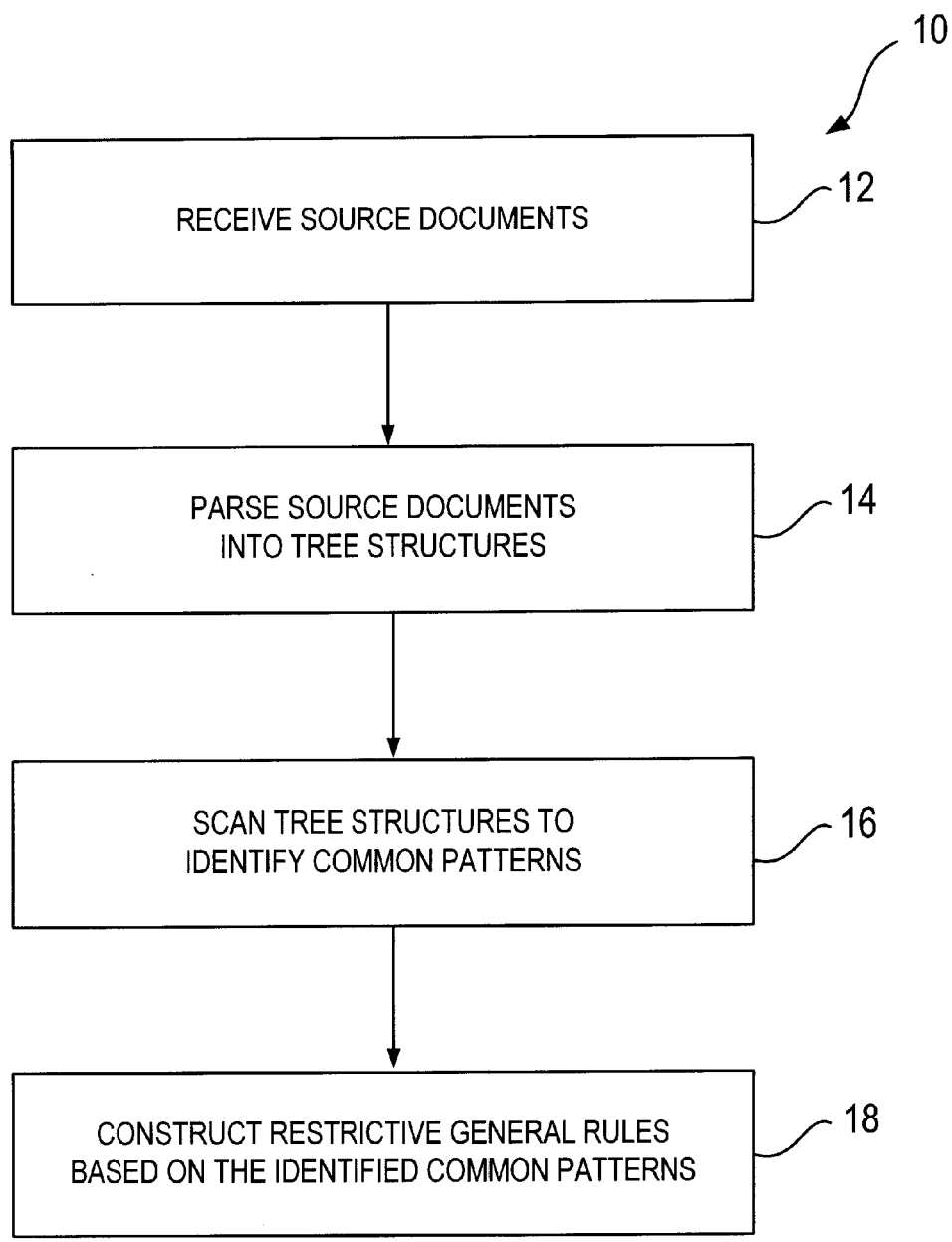
FIG. 1A is a flow diagram of a document type definition (DTD) building process.

Referring to FIG. 1A, a document type definition (DTD) building process 10 is shown. The process receives 12 as input one or more source documents. Each source document uses identical tag names for the same purpose (e.g., both use "para" to define certain text as a "paragraph"). Such source documents are understood and processed as tree-like structures, with each element type represented as a tree node. If trees corresponding to the source documents are not defined in the source documents themselves or stored in a separate file, the DTD building process will parse 14 the source documents to build tree structures for each of the source documents. The DTD building process scans 16 the tree structures of the source documents to identify common patterns.

In the embodiment described herein, a pattern is a substructure, such as a particular occurrence of an element and one or more of its sub-elements. Preferably, patterns may capture particular element attribute information, i.e., names, types and restricted values, as well.

To perform the task of identifying common patterns, the process 10 invokes a matching process, which may be implemented as any one of a number of known pattern matching algorithms. For details of such pattern matching algorithms, reference may be had to a book by Donald E. Knuth, entitled "The Art of Computer Programming," (Reading, Mass.; Addison-Wesley, 1973), as well as other sources. Having identified the common patterns, the DTD building process 10 constructs 18 a restrictive general rule for each element type based on the identified common patterns.

Figure 1B:
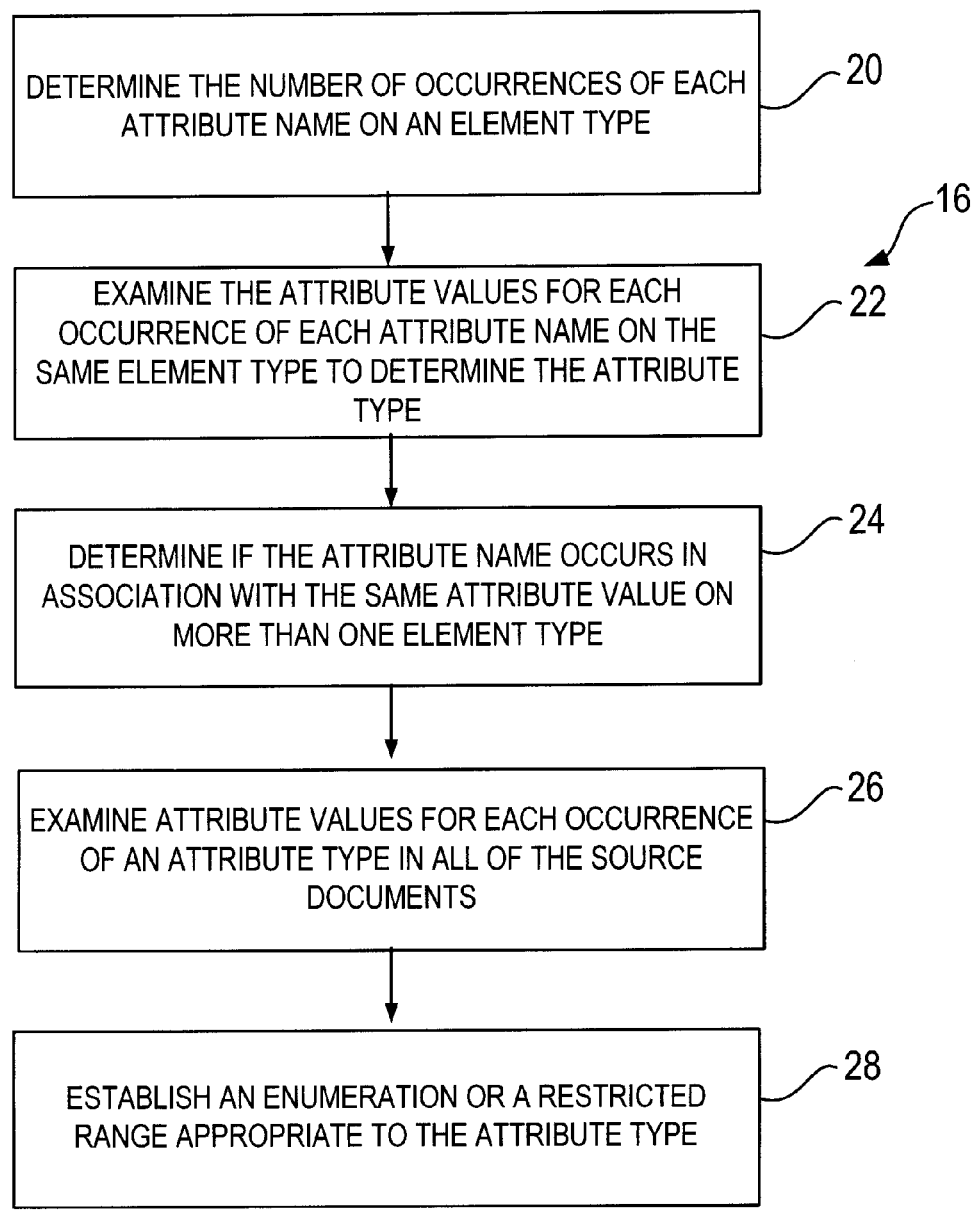
FIG. 1B is a flow diagram of the common pattern identification process (of FIG. 1A) as it pertains to attributes-based patterns

Referring to FIG. 1B, one aspect of identifying common patterns 16, that is, identifying common patterns which are based on attribute names, types and restricted values, is shown. The process determines 20 the number of occurrences of each attribute name on an element type and examines 22 the attribute values for each occurrence of each attribute name on the same element type to determine the attribute type. Additionally, the process may determine if the attribute occurs globally in a document or only on individual named element types. It determines 24 if the attribute name occurs in association with the same attribute value on more than one element type. To make such a determination, it will look at whether an attribute/value pair occurs on more than one element type. It can establish a standard deviation and test each source document in the collection against the standard deviation. For a given attribute type (as previously determined), the process examines 26 attribute values for each occurrence of the attribute type in all of the source documents and establishes 28 an enumeration or a restricted range appropriate to the attribute type.

Figure 1C:
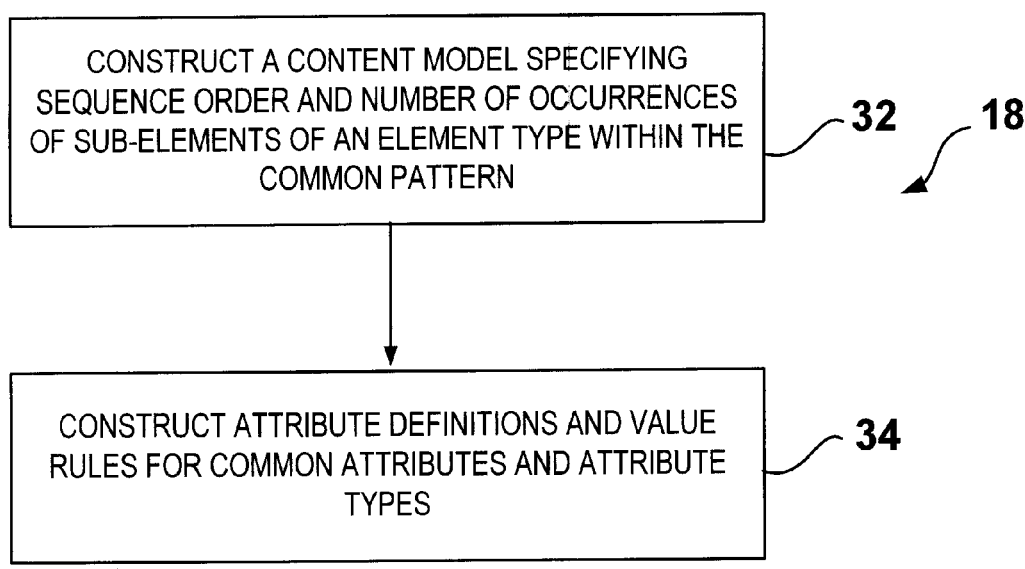
FIG. 1C is a flow diagram of the restrictive general rule construction process of the DTD building process of FIG. 1A.

Referring now to FIG. 1C, constructing 18 a restrictive general rule includes constructing 32 a content model to specify any sequence order/occurrence constraints associated with sub-elements occurring within the pattern (i.e., the common sub-elements), as well as constructing 34 attribute definitions and value rules for common attributes. The attribute definitions specify the association between attribute names and elements. The value rules specify the values that may be applied to particular named attributes. A specified value may be an enumeration, a set, a range or boolean expression.

It is preferable to modify the above-described process 10 to take into account those patterns that are shared by only some portion of the source documents. Such patterns are those that have achieved some predetermined threshold level of commonness, hereinafter referred to as "threshold patterns". The process 10 so modified would identify threshold patterns in addition to common patterns (at 16) and construct the restrictive general rules 18 to include the identified threshold patterns. Patterns which are below the predetermined threshold would not be included in the constructed rule. Suppose that a threshold is set at 10%. Consider then, for example, two documents having a total of 8 section elevens between them. Each section element contains one or more paragraph elements. If there is one section element that does not begin with a head element, then the pattern is at 12.5% (above the threshold) and the DTD building process constructs for the section element type the restricted general rule "head?, para+". In contrast, a pattern in which a section element immediately begins with a head element occurring in all but one out of fifteen section elements is at 6.6%, well below the threshold. Consequently, the DTD building process ignores the pattern and generates the rule "head, para+" for the section element type.

Optionally, the identification of common sub-structures may involve the application of a standard deviation test to detemrine "commonness" of patterns within a given source document. Given a statistically significant sample, any pattern which falls outside of the standard deviation from the mean can be either discarded or re-coded with local restrictive general rules to override the restrictive general rules of the DTD. Additionally, heuristic methods may be used to detect certain patterns as being erroneously generated or ill-formed, and therefore capable of being discarded.

The restrictive general rules, once constructed, are available for encoding in a document type definition template or file by a user of a system such as an electronic document publishing system.

It is important to consider that many electronic documents are provided with one or more style sheets specifying format characteristics for their display. A style sheet includes format characteristics for each type of element in a document. The format characteristics may include font styles and size, margins and other details relating to the appearance and behavior of a document. Because style sheets are often stored separate from their corresponding documents it may be necessary or desirable to a construct a style definition for a collection of such documents. Although the process 10 has been described above with reference to document type definitions, it is not so limited. It should be understood that the process 10 is a definition building process that is equally applicable to constructing style definitions for a set of style sheets.

Figure 2:
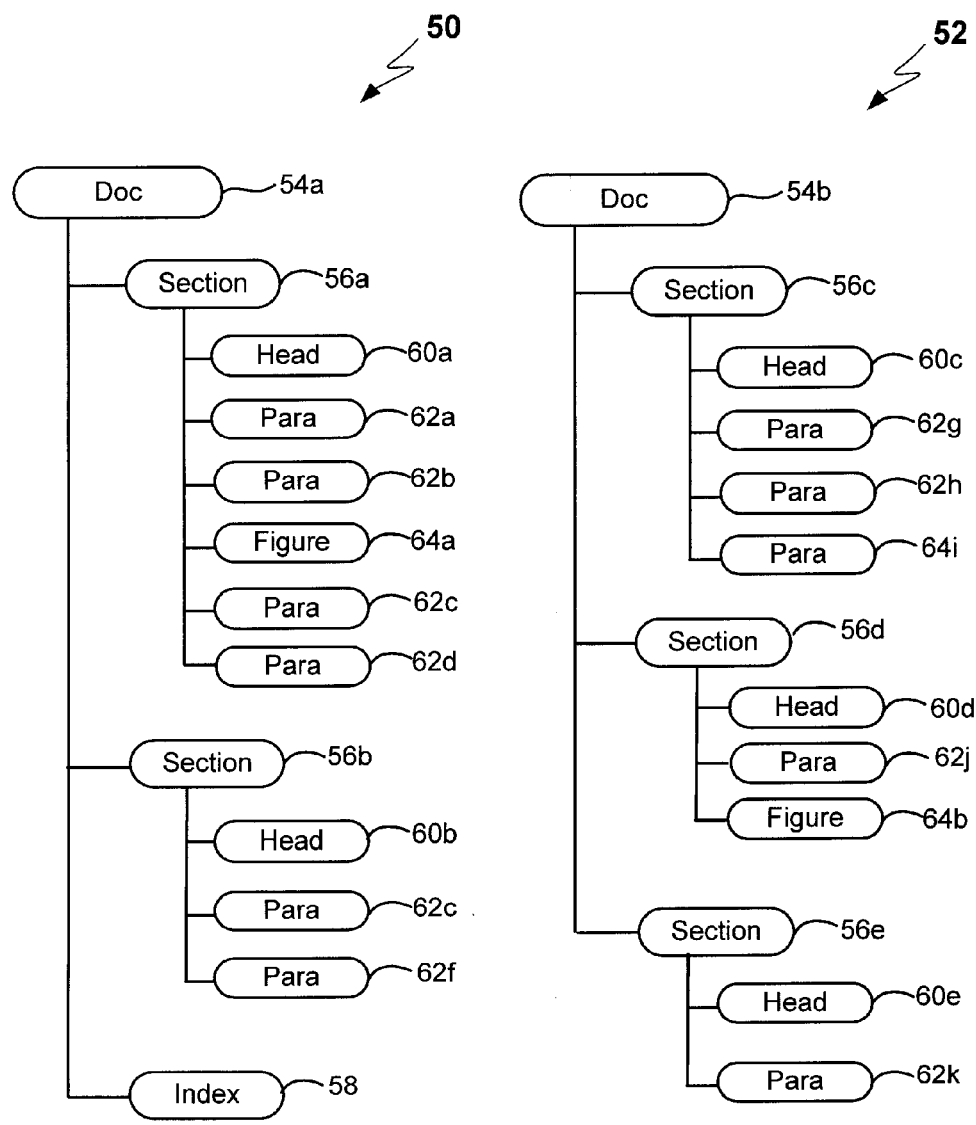
FIGS. 2-4 are hierarchical representations of two source documents for which a DTD is constructed in accordance with the DTD building process of FIG. 1A.
Figure 3:
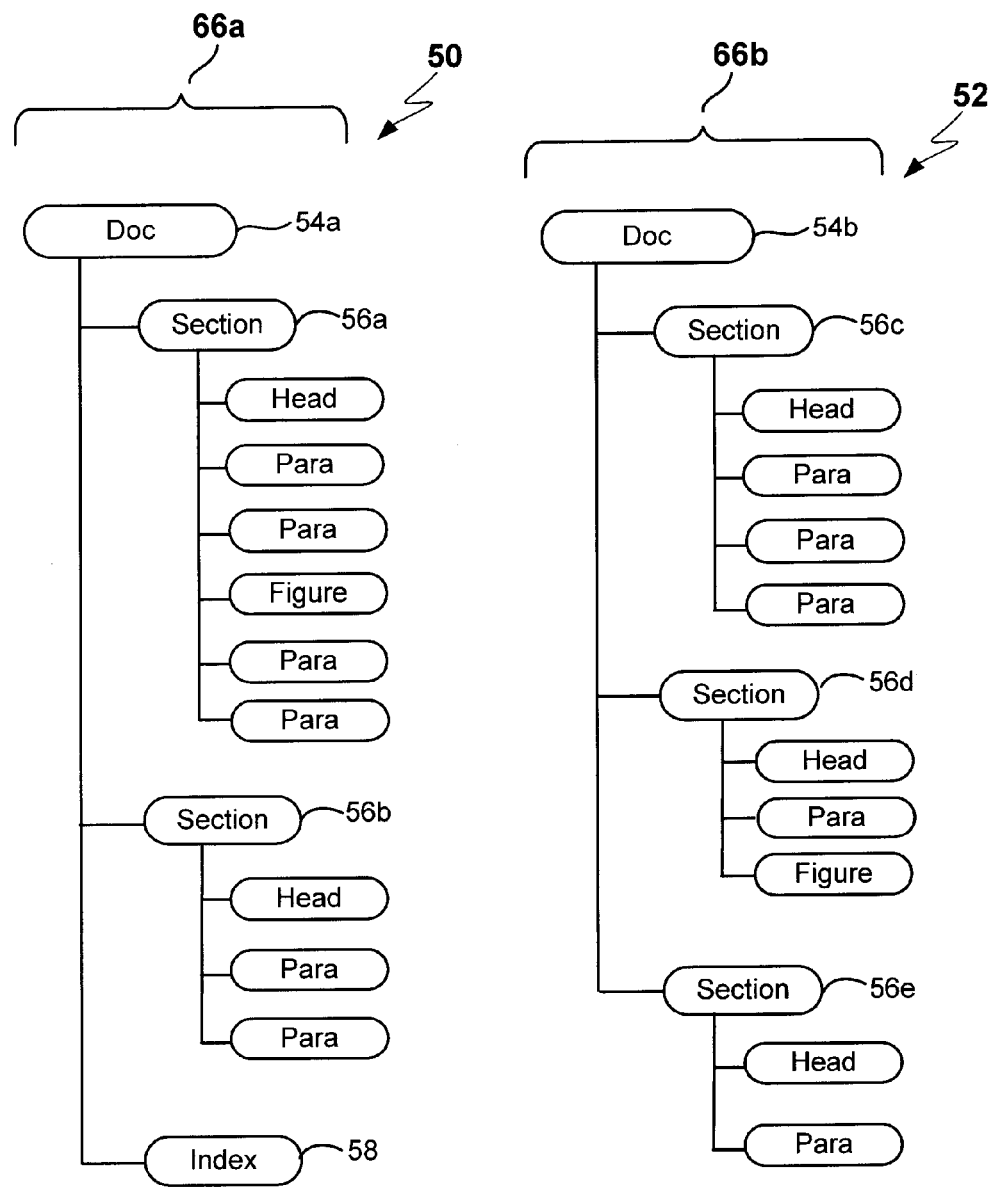
Figure 4:
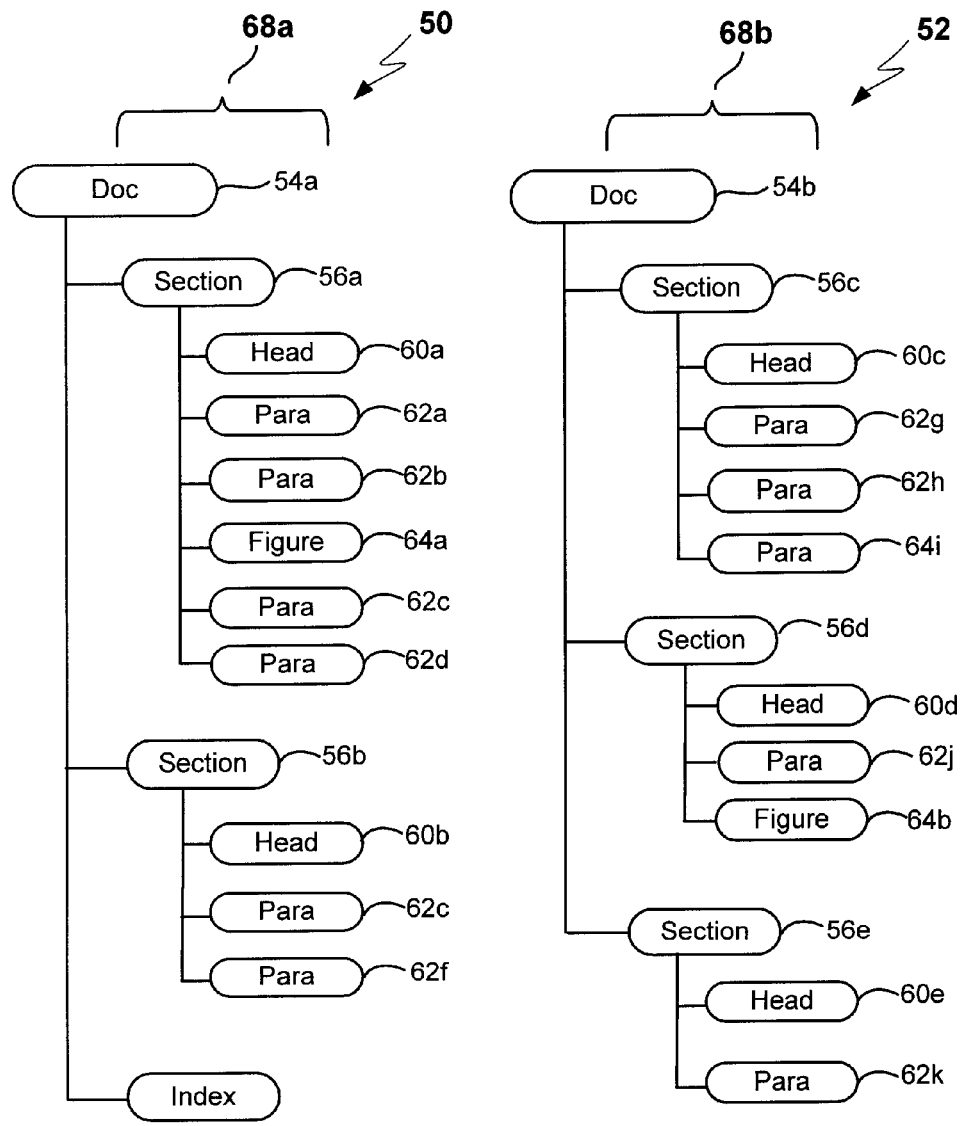

FIGS. 2-4 depict logical, hierarchical representations of two exemplary source documents that are received as input by the DTD building process 10. In FIGS. 2-4, like reference numerals are used in association with like elements and sub-elements.

Referring first to FIG. 2, a first source document 50 and a second source document 52 are shown. The structure of first source document 50 includes a root document element 54*a*. The root document element 54*a* contains two section elements 56*a* and 56*b*, followed by an index element 58. The section element 56*a* contains a head element 60*a*, followed by para elements 62*a* and 62*b*, figure element 64*a*, and para elements 62*c* and 62*d*. The section element 56*b* contains a head element 60*b*, followed by para elements 62*e* and 62*f*.

The structure of the second source document 52 includes a root document element 54*b*. The root document element includes three sections elements, section elements 56*c*, 56*d* and 56*e*, respectively. The section element 56*c* includes a head element 60*c*, followed by three para elements 62*g*, 62*h* and 62*i*, respectively. The section element 56*d* includes a head element 60*d*, followed by a para element 62*j* and a figure element 64*b*. The third section element 56*e* includes a head element 60*e* followed by a para element 62*k*.

Referring to FIG. 3, the hierarchical representations of the source documents 50 and 52 (from FIG. 2) are shown with first level sub-structures 66*a*, 66*b* identified as being common to both documents 50 and 52 highlighted by bolded lines. In the common (first level) sub-structure 66*a* of document 50, the document element 54*a* includes the section elements 56*a* and 56*b*. In the common (first level) sub-structure of document 52, the document element 54*b* includes sections 56*c*, 56*d* and 56*e*. The occurrence of index element 58 following sections (sections 56*a* and 56*b*) is not common.

The DTD building process 10 (FIG. 1A) constructs the restrictive general rule "section+, index?" for the document element 54 (i.e., 54*a* and 54*b*, collectively) based on the identified pattern. This restrictive general rule thus defines the document element 54 as containing one or more section elements followed by zero or one index element. Had there been a third source document which contained no sections within its document element, the process would have constructed the rule "section*, index?". The expression "section*, index?" is interpreted as zero or more section elements, followed by zero or one index element. Similarly, had a fourth document contained an index followed by a section, the rule would be constructed as "(section=index)*", thus requiring any number of section and/or index elements occurring in any order.

Referring now to FIG. 4, in addition to the first level sub-structures 66*a* and 66*b*, second level sub-substructures 68*a*, 68*b* are shown highlighted by bolded lines. Each section element (the section elements 56*a* through 56*e*) contains as sub-elements a head element, followed by a varied number of para elements. Additionally, the section elements 56*a* and 56*d* have figure elements 64*a* and 64*b*, respectively.

The DTD building process 10 (FIG. 1A) constructs for the section element type 56 (section elements 56*a* through 56*e*, collectively) the restrictive general rule "head, (para=figure)+". That is, a head element is followed by one or more para and/or figure elements. Alternatively, a tighter rule may be constructed. For example, the DTD building process could construct the restrictive general rule "head, para, (figure=para)*", which disallows a head followed by a figure.

After processing all common patterns shown in the representations of FIGS. 3 and 4, the DTD building process 10 will have constructed the following set of restrictive general rules for the source documents 50 and 52:

doc=section+, index?

section=head, (para=figure)+ index=<TEXT> head=<TEXT> para=<TEXT> figure=<TEXT>

These rules can be included in an available document type definition template or file.

Figure 5:
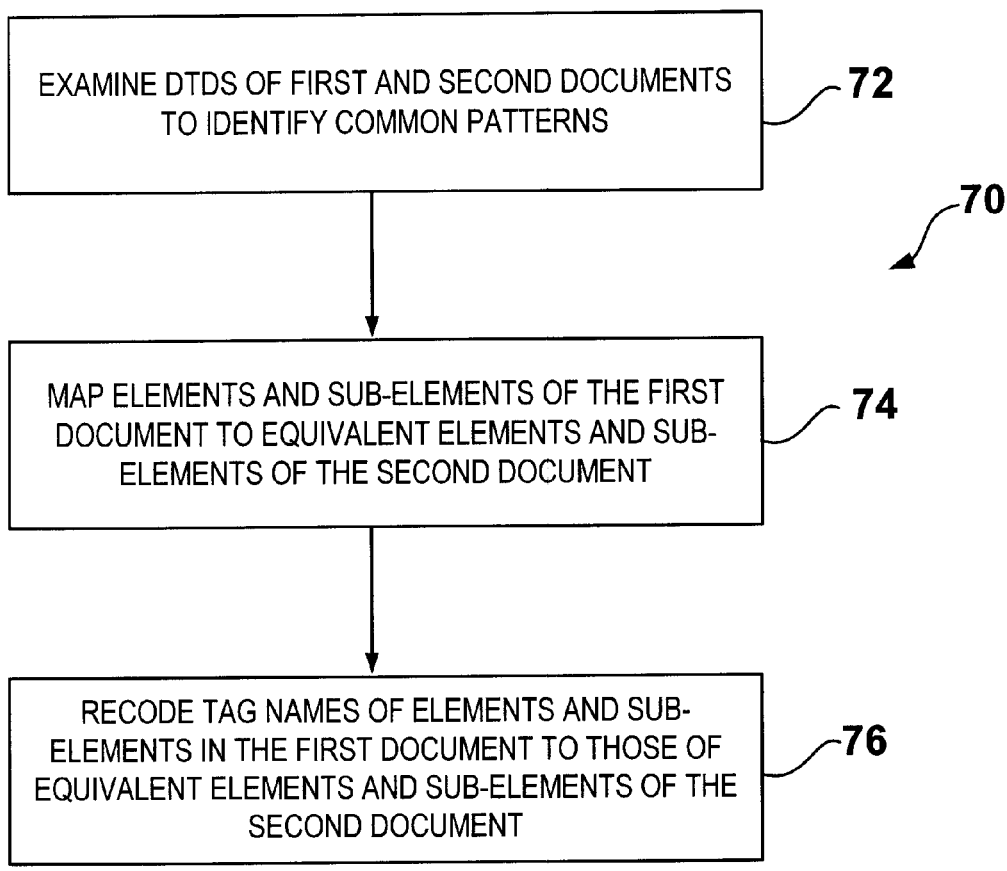
FIG. 5 is a flow diagram of a DTD mapping process.

Referring now to FIG. 5, a DTD mapping process (or mapping process) 70 is shown. The DTD mapping process 70 is used to convert one or more "orphan" documents to the same format as another document or set of documents. For example, a publisher may wish to integrate into a set of electronic technical manuals a document that was produced electronically by another publisher in a different format. In yet another example, some documents in a set of documents may have been updated in a different format from that of the original set and it may be desirable to unify the entire set under the new format. In these typical scenarios, the process would convert the DTD of the "orphan" document (or documents) to a target DTD, that is, the DTD associated with second document or set of documents having the format to which the document set publisher wishes to conform the orphan document or documents. Simply stated, the goal is to make a first document or set of documents look like a second document or set of documents.

The DTD mapping process 70 examines 72 the document type definitions of a first and a second source document to identify common patterns. As mentioned earlier (with respect to the DTD building process 10), patterns may include elements, sub-elements and corresponding attributes (or more particularly, attribute types, names and values). The DTD mapping process 70 maps 74 equivalencies between elements and sub-elements in the common pattern of the first source document and elements and sub-elements in the common pattern in the second source document. Once the DTD mapping process 70 has mapped elements and sub-elements of the first source document with elements and sub-elements of the second source document, the DTD mapping process 70 changes 76 the tag names of each element and sub-element in the first source document to the equivalent element and sub-element of the second source document.

If the source DTD, i.e., the DTD for a collection of documents to be recorded via the target DTD, does not exist, the DTD mapping process 70 needs to construct it. The source DTD can be constructed according to the DTD building process 10 of FIG. 1A.

It should be noted that the common pattern identification procedure 70 (FIG. 5) involves pattern and/or heuristics matching techniques and may be bounded by the user according to user-specified criteria.

Referring to FIG. 6, a hierarchical representation of a exemplary structured source document 80 to be recoded (or "retagged") according to a target DTD, in this case, the DTD constructed for the source documents 50, 52 depicted in the representations of FIGS. 2-4 is shown. The structure of the source document 80 shown in FIG. 6 will now be described. A "pub" element 82 contains two "chapter" elements 84*a* and 84*b*. The "chapter" element 84*a* includes a heading element 86*a* followed by two "body" elements 88*a-b*. The body elements 88*a-b* are followed by a graphic element 90, where is in turn followed by another body element 88*c*. The chapter element 84*b* includes a heading element 86*b* and two body elements 88*d* and 88*e*.

The source document 80 may be associated with the following document type definition:
   pub=chapter+
   chapter=heading, (body=graphic)+
   heading=<TEXT>
   body=<TEXT>
   graphic=<TEXT>

Recall that the document type definition constructed for the structured documents 50 and 52 (from FIGS. 2-4) is as follows:
   doc=section+, index?
   section=head, (para=figure)+
   index=<TEXT>
   head=<TEXT>
   para=<TEXT>
   figure=<TEXT>

The DTD mapping process 70 (FIG. 5) examines, e.g., compares, 72 the two document type definitions, that is, the DTDs for the source document 80 and the DTD corresponding to the source documents 50 and 52, looking for common patterns. The DTD mapping process determines that the general rules for "section" and "chapter" have the same pattern, and that doc and pub have similar patterns. Alternatively, and as discussed above in reference to FIG. 5, the DTD mapping process might also use heuristics to find common sub-structures. For instance, element types with the same stem (e.g., "head" and "heading" ) might be equated.

The DTD mapping process 70 identifies 72 common patterns and maps 74 elements and sub-elements of the DTD for source document 80 to equivalent elements and sub-elements of the DTD constructed for the source documents 50 and 52. The equivalent element types are as follows:
   pub~doc
   chapter~section
   heading~head
   body~para
   graphic~figure The DTD mapping process recodes 76 source document 80, using the equivalent element types from the DTD constructed for the source documents 50 and 52. In other words, the tag names for the elements in source document 80 are changed to the tag names for the equivalent elements of the target DTD. The resulting source document is depicted in FIG. 7 as source document 90.

Referring to FIG. 7, the structure of the source document 90 (i.e., recorded source document 80 of FIG. 6) is now described. It should be noted that reference numbering convention for FIGS. 2-4 has been adopted in FIG. 7. A doc element 54*c* contains section elements 56*f*-*g*. The doc element 54*c* and section elements 56*f*-*g* are the "retagged" versions of the pub element 82 and chapter elements 84*a*, 84*b*, respectively. The section element 56*f* includes a head element 60*f* (formerly, "heading" 86*a*), two paragraph elements 62*l* and 62*m* (formerly, "body" elements 88*a*, 88*b*, respectively), a figure element 64*c* (formerly, "graphic" element 90) and another paragraph element 62*n* (formerly, body element 88*c*),. The section element 56*g* includes, as sub-elements, a head element 60*g*, followed by paragraph elements 62*o* and 62*p*. Sub-elements 60*g*, 62*o* and 62*p* correspond to the sub-elements 86*b*, 88*d* and 88*e*, respectively, of the original source document 80.

Figure 8:
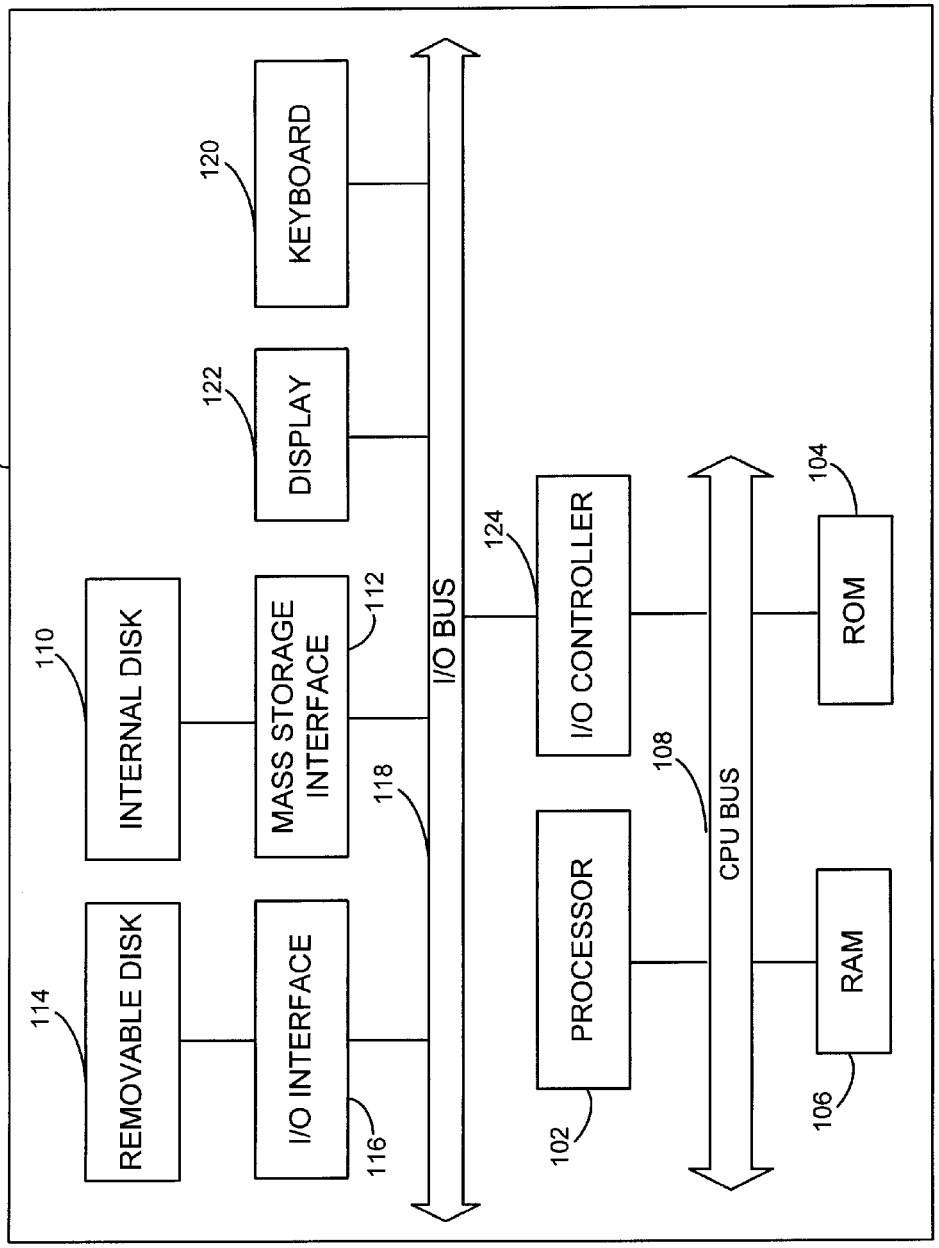
FIG. 8 is a block diagram of a computer system for supporting a electronic document publishing system including the DTD building process and DTD mapping process, as shown in FIG. 1A and FIG. 5, respectively.

Referring to FIG. 8, a computer system 100 for supporting the DTD building and mapping processes, as well as any matching or other processes invoked by these processes, is shown. The invention may be implemented in digital electronic circuitry or in computer system hardware, firmware, software, or in combinations of them. Apparatus of the invention may be implemented in a computer program product tangibly embodied in a machine-readable storage device for execution by a computer processor 102; and method steps of the invention may be performed by the computer processor 102 executing a program to perform functions of the invention by operating on input data and generating output.

Suitable processors include, by way of example, both general and special purpose microprocessors. Generally, the processor 102 will receive instructions and data from a read-only memory (ROM) 104 and/or a random access memory (RAM) 106 through a CPU bus 108. A computer can generally also receive programs and data from a storage medium such as an internal disk 110 operating through a mass storage interface 112 or a removable disk 114 operating through an I/O interface 116. The flow of data over an I/O bus 118 to and from I/O devices 110, 114, 120, 122 and the processor 102 and memory 104, 106 is controlled by an I/O controller 124. User input is obtained through a keyboard 120, mouse, stylus, microphone, trackball, touch-sensitive screen, or other input device. These elements will be found in a conventional desktop computer as well as other computers suitable for executing computer programs implementing the methods described here, which may be used in conjunction with any display device 122, or other raster output device capable of producing color or gray scale pixels on paper, film, display screen, or other output medium.

Storage devices suitable for tangibly embodying computer program instructions include all forms of non-volatile memory, including by way of example semiconductor memory devices, such as EPROM, EEPROM, and flash memory devices; magnetic disks such as internal hard disks 110 and removable disks 114; magneto-optical disks; and CD-ROM disks. Any of the foregoing may be supplemented by, or incorporated in, specially-designed ASICs (application-specific integrated circuits).

Typically, the DTD building, mapping and other related processes are components of an electronic document publishing system residing on the internal disk 110. These electronic document publishing system processes are executed by the processor 102 in response to a user request to the computer system's operating system (not shown) after being loaded into memory. The source documents processed by these electronic document publishing system processes may be retrieved from a mass storage device such as the internal disk 110 or other local memory, such as RAM 116 or ROM 104. It is also possible that the source documents could reside on and thus be retrieved from another computer system, such as a Web server.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims. For example, although the invention has been described with reference to an SGML-based implementation, it is not so limited. It should be understood that the invention is equally applicable to other languages and syntaxes that incorporate concepts like those found in SGML.

What is claimed is:

1. A computer executable method comprising:
receiving as input a first source document and a first document type definition for the first source document, the first source document conforming to the first document type definition;
receiving as input a target document type definition, the target document type definition being different from the first document type definition;
examining the first document type definition and the target document type definition to identify common patterns in the document type definitions, each of the common patterns being a substructure having a particular occurrence of a respective element and one or more of the sub-elements of the element, and common patterns being patterns existing in each of the first document type definition and target document type definition, including identifying an element that exists in each of the first and the target document type definitions but has a different name in the first document type definition than the target document type definition; and
using the common patterns identified examining the first and the target document type definitions to map without user intervention elements and sub-elements of the first document type definition in the first source document to recode the first source document according to the target document type definition to equivalent elements and sub-elements, including changing a first tag name of a first element in the first source document to a different second tag name.

2. The method of claim 1, wherein:
the target document type definition was derived automatically from one or more second documents.

3. The method of claim 1, wherein:
receiving the first document type definition comprises producing the first document type definition for the first source document if the document type definition for the first source document does not already exist.

4. The method of claim 1, wherein identifying common patterns comprises:
performing pattern matching between structures defined by the first document type definition and structures defined by the second document type definitions.

5. The method of claim 1, wherein identifying common patterns further comprises:
using heuristics to find common structure in the first document type definition and the second document type definition.

6. The method of claim 1, wherein
the substructure of at least one of the common patterns further includes attribute information of the respective elemnt.

7. A computer executable method of converting the format of a source document to the format of a set of source documents, the source document conforming to a first document type definition, the set of source documents having documents each conforming to a target document type definition, the method comprising:
examining the first document type definition and the target document type definition to identify patterns common to the source document and the set of source documents, each of the patterns being a substructure having a particular occurrence of an element and one or more of the sub-elements of the element, including identifying an element that is exists in each of the first source document and the set of source documents but has a different name in the first source document than in the set of source documents;
mapping, without user intervention, elements and sub-elements in the common pattern of the source document to equivalent elements and sub-elements in the common pattern of the set of source documents, including mapping a first element in the first source document to a second element in the second source document based on the identified common patterns, the first element and the second element having different element names; and
replacing tag names for the each of the elements and sub-elements in the common pattern of the source document with the equivalent tag names of the elements and sub-elements in the common pattern of the set of source documents.

8. The method of claim 7, wherein identifying patterns common to the source document and the set of source documents comprises:
examining document type definitions for the source document and the set of source documents.

9. The method of claim 8, further comprising:
producing the document type definition for the source document if the document type definition for the source document does not already exist.

10. A computer program residing on a computer-readable medium, the computer program comprising instructions operable to cause a computer system to:
receive as input a first source document and a first document type definition for the first source document, the first source document conforming to the first document type definition;
receive as input a target document type definition, the target document type definition being different from the first document type definition;
examine the first document type definition and the target document type definition to identify common patterns in the document type definitions; each of the common patterns being a substructure having a particular occurrence of an element and one or more of the sub-elements of the element, and common patterns being patterns existing in each of the first document type definition and the target document type definition, including identifying an element that exists in each of the first and the target document type definitions but has a different name in the first document type definition than in the target document type definition; and
use the common patterns identified by examining the first and the target document type definitions to map without user intervention elements and sub-elements in the first document type definition of the first source document to recode the first source document according to the target document type definition to equivalent elements and sub-elements, including instructions operable to cause the computer system to change a first tag name of a first element in the first source document to a different second tag name.

11. The computer program of claim 10, further comprising instructions operable to cause a computer system to:
produce the first document type definition for the first source document if a document type definition for the first source document does not already exist.

12. The computer program of claim 10, wherein the instructions operable to cause a computer system to identify common patterns comprise instructions operable to cause a computer system to:

perform pattern matching between structures defined by the first document type definition and structures defined by the second document type definition.

13. The computer program of claim 10, wherein the instructions operable to cause a computer system to identify patterns common to the first and second source documents further comprises instructions operable to cause a computer system to:

use heuristics to find common structure in the first document type definition and the second document type definition.

14. A computer system comprising:

a storage device for storing a source document and a set of source documents, the source document having a format different from that of the set of source documents, the source document conforming to a first document type definition and the documents in the set of source documents each conforming to a target document type definition; and a computer processor configured by a mapping program to identify patterns common to the source document and the set of source documents by examining the first document type definition and the target document type definition to identify common patterns in the document type definitions, each of the common patterns being a substructure having a particular occurrence of an element and one or more of the sub-elements of the element, and map, without user intervention, elements and sub-elements in the common pattern of the source document to equivalent elements and sub-elements in the common pattern of the set of source documents, including to identify an element that is common to the first and second source documents but has a different name in the first source document than in the second source document and wherein to map elements includes to map a first element in the first source document to a second element in the second source document based on the identified common patterns, the first element and the second element having different element names.

15. A computer program residing on a computer-readable medium for converting the format of a source document to the format of a set of source documents, the source document conforming to a first document type definition, the set of source documents having documents each conforming to a target document type definition the computer program comprising instructions operable to cause a computer system to:

examine the first document type definition and the target type definition to identify patterns common to the source document and the set of source documents, each of the patterns being a substructure having a particular occurrence of an element and one or more of the sub-elements of the element, including to identify an element that is exists in each of the first source document and the set of source documents but has a different name in the first source document than in the second source document;

map, without user intervention, elements and sub-elements in the common pattern of the source document to equivalent elements and sub-elements in the common pattern of the set of source documents, including mapping a first element in the first source document to a second element in the second source document based on the identified common patterns, the first element and the second element having different element names; and replace tag names for the each of the elements and sub-elements in common pattern of the source document with the equivalent tag names of the elements and sub-elements in common pattern of the set of source documents.

16. The computer program of claim 15, wherein the instructions causing a computer system to identify patterns common to the source document and the set of source documents comprises instructions causing a computer system to:

examine document type definitions for the source document and the set of source documents.

17. The computer program of claim 16, further comprising instructions causing a computer system to:

produce the document type definition for the source document if the document type definition for the source document does not already exist.

* * * * *